Figure 2:
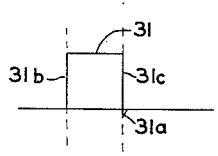

Feb. 17, 1953     D. R. DE BOISBLANC     2,629,053
DETONATION METER CALIBRATOR

Filed March 15, 1948     2 SHEETS—SHEET 1

FIG. 1

FIG. 9

*INVENTOR.*
D. R. DE BOISBLANC
BY Hudson & Young
*ATTORNEYS*

Feb. 17, 1953  D. R. DE BOISBLANC  2,629,053
DETONATION METER CALIBRATOR

Filed March 15, 1948  2 SHEETS—SHEET 2

*INVENTOR.*
D. R. DE BOISBLANC
BY *Hudson & Young*
*ATTORNEYS*

Patented Feb. 17, 1953

2,629,053

UNITED STATES PATENT OFFICE 2,629,053

DETONATION METER CALIBRATOR

Deslonde R. de Boisblanc, Bartlesville, Okla., assignor to Phillips Petroleum Company, a corporation of Delaware Application March 15, 1948, Serial No. 14,877

7 Claims. (Cl. 250—36)

This invention relates to a detonation meter calibrator for producing an output simulating voltage waves from an electro-mechanical transducer representative of detonation in the cylinder of an internal combustion engine.

In the study of detonations or explosions in internal combustion engine cylinders, it has become common practice to utilize an instrument, such as a pick-up, for converting pressure variations in the cylinder into electric currents. The output of such a pick-up is fed to a detonation meter wherein the electrical currents are filtered and altered so as to provide a meter reading indicative of the detonation occurring in the cylinder. The portion of the pick-up output which is of interest consists of a relatively slowly varying voltage wave representative of the main pressure wave in the cylinder and, when the engine is operated under conditions causing knocking or detonation, a peak or "pip" is superimposed upon this slowly varying wave thereby indicating the knocking conditions prevalent in the cylinder. The function of the detonation meter is to separate this detonation peak from the main pressure wave and from the objectional voltage components resulting from other disturbances, such as valve clatter.

With the widespread adoption of such detonation meters, it has become desirable to provide apparatus for producing an output simulating the voltage waves produced by the pick-up device. By producing such a wave and varying the components thereof, a detonation meter may be calibrated in terms of the relative detonation intensities caused by test fuels of differing octane number.

It is an object of this invention to provide a calibrating device for producing an output simulating the voltages produced by the pick-ups utilized with detonation meters.

It is a further object of this invention to provide such a calibrating device in which the configuration and amplitude of the generated waves may be varied to simulate variations in knocking or detonation intensity resulting from changes in octane number of the test fuel in a standard engine.

It is a further object of the invention to provide such a calibration device which is simple in construction, reliable in operation, and economical to build and assemble.

Various other objects, advantages and features of the invention will become apparent from the following detailed description taken in conjunction with the accompanying drawings, in which:

Figure 1 is a block diagram of the detonation meter calibrator;

Figures 2 to 8, inclusive, are graphs illustrating the wave forms in various parts of the calibrator circuit; and Figure 9 is a schematic circuit diagram showing the complete circuit of the detonation meter calibrator.

Figure 8:
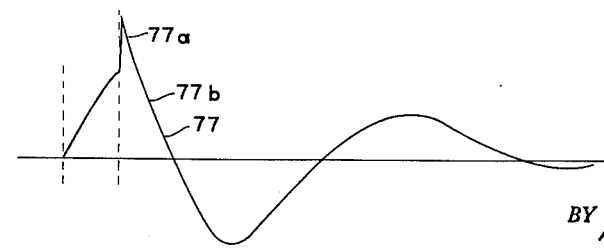

The novel calibration circuit produces an output as indicated in Figure 8, simulating the voltage produced by a detonation pick-up. The wave form consists of a succession of spaced, highly damped waves simulating the respective main pressure waves in a cylinder together with a peak or "pip" on each damped waves simulating detonations in the cylinder. This output is produced by mixing a sharply decaying pulse with voltage waves produced by a damped resonant circuit, both the differentiating circuit and resonant circuit being excited by spaced pulses from a single multivibrator unit.

Figure 3:
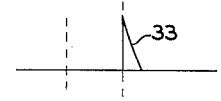
Figure 4:
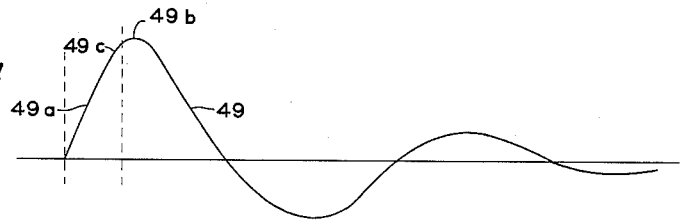
Figure 5:
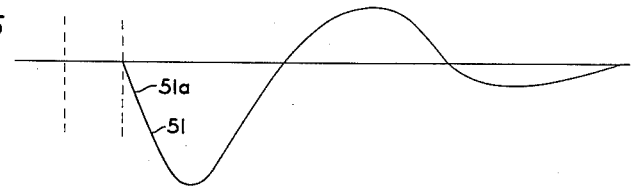

Referring now to the drawings in detail, a multivibrator 10 is provided for producing two separate wave forms as indicated, respectively, by Figures 2 and 3. The multivibrator circuit is of generally conventional construction and may include a pair of electron tubes 11 and 12 each having at least an anode, a cathode, and a control grid. The cathodes of the tubes are both grounded by a conductor 13 and a pair of resistors 14, 15 are connected between the grids of the respective electron tubes and ground. Current is supplied from a positive terminal 17 of the power supply through resistors 18 and 19, respectively, to the anodes of the tubes. Further, the anode of tube 11 and the control grid of tube 12 are interconnected by a condenser 21 while the anode of tube 12 and the control grid of tube 11 are interconnected by a condenser 22. The multivibrator circuit is synchronized by a pulsating voltage applied to the grid of tube 11 by a conductor 24, this conductor including a condenser 25 and extending to the movable arm of a potentiometer 26 which is connected between ground at 27 and a positive terminal 28 of the power supply. It will be noted that the terminal 28 supplies unfiltered or pulsating current through potentiometer 26 and condenser 25 to the grid of tube 11 thereby controlling operation of the multivibrator at a frequency which is a sub-multiple of the alternating current power supply frequency.

As those skilled in the art will understand, the wave form produced at the anode of tube 11 is controlled by the value of the resistance-capacitance unit 15, 21 and this value is so chosen as to produce an approximately rectangular wave 31 at the anode of tube 11 each time the multivibrator circuit is actuated. A small exponential pulse 31a of opposite polarity may also be produced at the end of the rectangular wave but this does not change the operation of subsequent parts of the circuit. Suitable constants for obtaining such a rectangular wave are a value of 250 mmfd. for condenser 21 and a value of 1 megohm for resistor 15. In similar fashion, the voltage at the anode of tube 12 is controlled by the values of the resistance-capacitance unit 14, 22 and these values are so chosen as to produce an exponential pulse 33, Figure 3, at the anode of tube 12 each time the multivibrator circuit is actuated. It will be observed that the pulse 33 appears at the anode of tube 12 at practically the same instant that the rectangular wave 31 is terminated. Suitable constants for the resistance-capacitance unit 14, 22 are a value of .25 mmfd. for condenser 22 and a value of 1 megohm for resistor 14.

The rectangular wave pulses 31 appearing at the anode of tube 11 are fed through a coupling condenser 34 and a resistor 35 to the input terminals 36, 37 of a damped resonant circuit 40. The input terminal 36 and grounded terminal 37 are interconnected by a potentiometer 41, the arm of which is connected to an output terminal 42 of the resonant circuit 40, the other output terminal 43 being grounded at 44. The potentiometer 41 is shunted by a damped resonant circuit consisting of an inductance or choke 46, a condenser 47, and a resistor 48. The values of these components are so chosen that the output of the circuit 40 is highly damped and only the first cycle of the wave train is of sufficient amplitude as to be of importance in the output of the calibrating unit. Suitable values for obtaining this result are a value of 2.5 henrys for the choke 46, a value of 3 mfd. for condenser 47 and a value of 1,000 ohms for resistor 48.

Each time a rectangular wave pulse 31 is produced by the multivibrator circuit, the resonant circuit 40 is shock excited by the sudden change in voltage represented by the wave front 31b, Figure 2. As a result, a highly damped sinusoidal wave train 49, Figure 4, appears in the circuit 40. It will be noted that the wave 49 begins at substantially the same time as the rectangular wave pulse 31. The damped resonant circuit 40 is also shock excited by the sudden change in voltage represented by the end portion 31c of the rectangular wave pulse 31, this change in voltage being in opposite direction from the voltage change represented by the portion 31b. This produces a second damped sinusoidal wave train 51, Figure 5, which is of opposite polarity from the wave train 49 and which differs in phase from wave train 49 by the width of the rectangular wave pulse 31.

Figure 6:
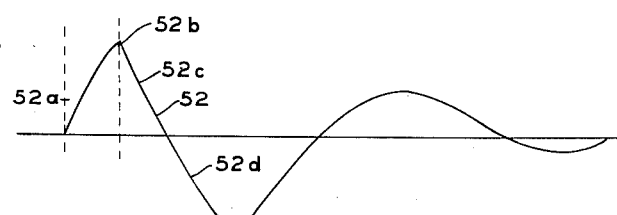
Figure 7:
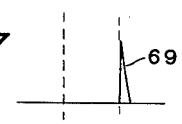

The output of the damped resonant circuit 40, which is shown at 52, Figure 6, consists of the algebraic sum of the wave trains 49 and 51. Accordingly, the portion 52a, which is coincident with the rectangular wave pulse 31, is of the same shape as the corresponding portion 49a of wave train 49. The slope of the portion 52a continuously decreases until the curve reaches a peak value 52b at the end of the rectangular wave pulse 31. Thereupon, the amplitude of the wave train 52 decreases, as is indicated by the portion 52c, the amplitude of this part of the wave train being the algebraic sum of the waves 49 and 51. This decrease in amplitude results from the fact that the initial portion 51a of wave 51 is considerably steeper than the corresponding portion 49b of wave train 49. Thus, the slope of the portion 52c is substantially controlled by the slope of the portion 51a. The portion 52c of curve then merges into a highly damped generally sinusoidal portion 52d.

At the time the rectangular wave 31 is terminated, the amplitude of the voltage wave 49 at 49c is changing very slowly and it is this amplitude which determines the height of the voltage peak 52b. A small change in the width of the rectangular wave will cause the point 49c to shift longitudinally a short distance and this shifting will cause a correspondingly small change in the amplitude at 49c which controls the peak amplitude 52b of the voltage wave 52. As a result, the peak amplitude 52b is substantially independent of small variations in the width of the rectangular wave pulse 31 caused, for example, by power line fluctuations.

The pulses 33 from the multivibrator circuit are fed from the anode of tube 12 to a differentiating circuit 60 by a conductor 61 connected to an input terminal 62, the other input terminal 63 being grounded at 64. The differentiating circuit consists of a condenser 65 connected in series with a resistor 66 and a grounded potentiometer 67, the arm of which is connected to one of a set of output terminals 68, the other output terminal 68 being grounded. The value of the condenser and resistors is so chosen that a sharply decaying exponential pulse 69, Figure 7, of very short duration is produced by the differentiating circuit. Further, due to the fact that the original pulse 33, which is differentiated by the circuit 60 occurs at the end of the corresponding rectangular wave 31, each pulse 69 occurs during the first half cycle of the corresponding wave 52 and while the voltage of wave 52 is at its peak value. Suitable values for obtaining this result are a value of .001 mfd. for condenser 65, a value of 50,000 ohms for resistor 66, and a value of 1000 ohms for the potentiometer 67. It will be apparent that the setting of potentiometer 67 controls the amplitude of the pulses 69 produced by the differentiating circuit.

In accordance with the invention, a mixing circuit 70 is provided for superimposing the differentiated pulses 69 upon the respective voltage waves 52. To this end, output terminal 42 is connected by a resistor 71 to an output terminal 72 of the mixer, the other output terminal 73 being grounded at 74. Further, one output terminal 68 is connected by a resistor 75 to output terminal 72 and the terminals 42, 43 are shunted by a resistor 76. The resulting voltage wave 77 appearing at the output of the mixer is indicated in Figure 8 in which it will be noted that a peak or "pip" 77a is superimposed upon a component 77b from the output of the damped resonant circuit 40. The wave form 77 simulates the voltage waves produced by a detonation pick-up utilized with internal combustion engines. More specifically, the portion 77b corresponds to the main pressure wave caused by reciprocating movement of the piston while the peak 77a corresponds to the disturbance of relatively great amplitude which is produced when a detonation or explosion occurs in the cylinder.

From the terminals 72, 73 the voltage wave shown by Figure 6 is fed through a conventional power amplifier 80 and thence to the output terminals of the apparatus. The amplifier 80 is of conventional construction and may include two triodes 81, 82 each having an anode, a cathode, and a control grid. The grid of triode 81 is connected to the terminal 72 while the cathode is grounded through a bias resistor 83. The anode of tube 81 is connected through a resistor 84 to a positive power supply terminal 85 and through a coupling condenser 86 to the control grid of tube 82. The gain of the amplifier may be varied by a switch 87 which is connected in series with a resistor 88, this unit being connected between the anode of tube 81 and ground. A grounded load resistor 89 is connected between the control grid of tube 82 and ground while the anode of this tube is connected directly to a positive terminal 90 of the power supply. The cathode circuit of tube 82 includes the primary winding of a transformer 91, the amplified output being taken from the secondary winding of this transformer. The unit also includes a power supply unit 92 having a grounded negative terminal 93 and a positive terminal 94 from which filtered current is supplied to terminals 17, 85 and 90.

From the foregoing description, it will be apparent that I have provided a calibrating circuit for producing an output simulating voltage waves representative of detonation in the cylinder of an internal combustion engine. The output, which has the wave form 77, Figure 8, may be readily controlled by suitable circuit adjustments. Thus, the amplitude of the peak or pulse 77a may be varied by adjustment of potentiometer 67 while the amplitude of the component 77b may be varied by adjustment of the potentiometer 41. By actuation of switch 87, the level of output may be changed by an amount corresponding to the difference in signal height observed on a detonation pick-up when two fuels differing by one octane number are compared. Accordingly, by the use of the disclosed circuit, a detonation meter may be readily calibrated in terms of the octane number of test fuels to be used in a standard engine. The described calibrator circuit is also advantageous in that the peak value 52b of the voltage wave 52 produced by the circuit 40 is substantially constant and is practically independent of changes in the width of the rectangular wave 31 caused by power line fluctuations in the multivibrator circuit.

The disclosed circuit is very advantageous in that both the components 52 and pulses 69 are generated by a single multivibrator circuit. This effects a considerable saving in the number of parts required and insures that the two components of the output signal have the desired phase relationship since the pulse 33 is produced by the multivibrator at the end of each rectangular wave 31. It is a further feature of the invention that the synchronizing impulses supplied to the multivibrator circuit are derived from the conventional power supply unit by providing terminal 28 from which unfiltered or pulsating direct current may be drawn and applied to the grid of the multivibrator.

It is important that the resonant circuit 40 be adequately damped in order to provide only a single effective sinusoidal cycle. This results from the fact that the single damped wave form shown approximates the shape of the pressure wave observed in the output of a detonation pick-up. If the wave 49 were not damped, successive voltage waves would overlap and thereby produce a wave form unlike that shown at 77 in Figure 6.

While the invention has been described in connection with a present, preferred embodiment thereof, it is to be understood that this description is illustrative only and is not intended to limit the invention, the scope of which is defined by the appended claims.

I claim:

1. A detonation meter calibration device comprising, in combination, a multivibrator circuit including a pair of resistance-capacitance units, the time constant of one unit being adjusted to produce a rectangular wave and the time constant of the other unit being selected so as to produce a pulse at the end of each rectangular wave, a damped resonant circuit tuned to a frequency such that one quarter cycle of the alternating voltage wave produced thereby is of equal duration to said rectangular wave, means for feeding the rectangular waves to said resonant circuit to provide a succession of voltage waves, means for differentiating said exponential pulses, and a mixing circuit for superimposing the differentiated pulses directly upon the respective voltage waves.

2. A detonation meter calibration device comprising, in combination, a multivibrator circuit including a pair of resistance-capacitance units, the time constant of one unit being adjusted to produce a rectangular wave and the time constant of the other unit being selected so as to produce a pulse at the end of each rectangular wave, a damped resonant circuit, means for feeding the rectangular waves to said resonant circuit to provide a succession of voltage waves, each wave being produced by two damped sinusoidal components of opposite polarity and different phase, said phase difference being equal to the width of said rectangular wave, means for differentiating said exponential pulses, a mixing circuit for superimposing the differentiated pulses upon the respective voltage waves, a power amplifier, means for feeding the output of said mixing circuit directly to said power amplifier, and means for varying the gain of said power amplifier.

3. In a detonation meter calibrator, a multivibrator unit including a pair of electron tubes each having an anode, a cathode, and a control grid, a pair of resistance-capacitance units each coupling the control grid of one tube to the anode of the other tube, the time constant of one resistance-capacitance unit being adjusted so as to produce a succession of rectangular waves, and the time constant of the other resistance-capacitance unit being adjusted so as to produce an exponential pulse at the end of each rectangular wave, a damped resonant circuit including an inductance-capacitance unit and a resistor for discharging said capacitance, said circuit being tuned to a frequency such that one quarter cycle of the alternating voltage wave produced thereby is of equal duration to said rectangular wave, means for feeding said rectangular waves to said damped resonant circuit thereby to produce a succession of damped voltage waves each consisting essentially of a single cycle, and means for feeding the pulses produced by said multivibrator without appreciable time delay to the output of said damped resonant circuit thereby to superimpose the pulses on the first peak portion of the respective voltage waves.

4. In a detonation meter calibrator, a multivibrator unit including a pair of electron tubes each having an anode, a cathode, and a control grid, a pair of resistance-capacitance units each coupling the control grid of one tube to the anode of the other tube, the time constant of one resistance-capacitance unit being adjusted so as to produce a succession of rectangular waves, and the time constant of the other resistance-capacitance unit being adjusted so as to produce an exponential pulse at the end of each rectangular wave, means for feeding a pulsating current to the control grid of one of said tubes thereby to control operation of the multivibrator circuit at a frequency which is a submultiple of the pulsating current frequency, a damped resonant circuit including an inductance-capacitance unit and a resistor for discharging said capacitance, said circuit being tuned to a frequency such that one quarter cycle of the alternating voltage wave produced thereby is of equal duration to said rectangular wave, means for feeding said rectangular waves to said damped resonant circuit thereby to produce a succession of damped voltage waves each consisting essentially of a single cycle, and means for feeding the pulses produced by said multivibrator without appreciable time delay to the output of said damped resonant circuit thereby to superimpose the pulses on the respective first peak portion of the damped voltage waves.

5. A detonation meter calibration device comprising, in combination, a multivibrator circuit including a pair of resistance-capacitance units, the time constant of one unit being adjusted to produce a rectangular wave and the time constant of the other unit being selected so as to produce an exponential pulse at the end of each rectangular wave, a damped resonant circuit tuned to a frequency such that one quarter cycle of the alternating voltage wave produced thereby is of equal duration to said rectangular wave, means for feeding the rectangular waves to said resonant circuit whereby said circuit is shock excited at the beginning and end of each rectangular wave, the resulting output of said circuit having a peak value which is substantially independent of the width of the rectangular wave, means for differentiating said exponential pulses, and a mixing circuit for superimposing the differentiated pulses upon the respective peak portions of the output of the damped resonant circuit thereby to produce a wave from simulating the output of a detonation pick-up.

6. A detonation meter calibration device comprising, in combination, a multivibrator circuit including a pair of resistance-capacitance units, the time constant of one unit being adjusted to produce a rectangular wave and the time constant of the other unit being selected so as to produce an exponential pulse at the end of each rectangular wave, a damped resonant circuit, means for feeding the rectangular waves to said resonant circuit whereby it is shock excited at the beginning of each rectangular wave to produce a damped sinusoidal wave train, said circuit being shock excited at the end of each rectangular wave to produce a damped sinusoidal wave train of opposite polarity from said first wave train and displaced in phase therefrom by the width of the rectangular wave, the resulting output of the resonant circuit having a peak value which is substantially independent of the width of the rectangular wave, and means for mixing exponential pulses derived from said multivibrator circuit with the output of said resonant circuit without appreciable time delay to produce a voltage wave simulating the output of a detonation pick-up.

7. A detonation meter calibration device comprising, in combination, a multivibrator circuit including a pair of resistance-capacitance units, the time constant of one unit being adjusted to produce a rectangular wave and the time constant of the other unit being selected so as to produce a pulse at the end of each rectangular wave, a damped resonant circuit tuned to a frequency such that one quarter cycle of the alternating voltage wave produced thereby is of equal duration to said rectangular wave, means for feeding the rectangular waves to said resonant circuit to provide a succession of voltage waves, and a mixing circuit for superimposing said pulses without appreciable time delay upon the respective peak portions of said voltage waves.

DESLONDE R. DE BOISBLANC.

REFERENCES CITED

The following references are of record in the file of this patent:

UNITED STATES PATENTS

| Number | Name | Date |
|---|---|---|
| 2,426,225 | Krause | Aug. 26, 1937 |
| 2,236,705 | Campbell | Apr. 1, 1941 |
| 2,408,079 | Labin et al. | Sept. 24, 1946 |
| 2,411,547 | Labin et al. | Nov. 26, 1946 |
| 2,416,306 | Grieg | Feb. 25, 1947 |
| 2,434,920 | Grieg | Jan. 27, 1948 |
| 2,434,922 | Grieg | Jan. 27, 1948 |
| 2,438,904 | De Rosa | Apr. 6, 1948 |
| 2,484,352 | Miller et al. | Oct. 11, 1949 |